(12) United States Patent
Raphaeli et al.

(10) Patent No.: US 7,463,709 B2
(45) Date of Patent: Dec. 9, 2008

(54) METHOD AND APPARATUS FOR GENERATING A SYNCHRONIZATION SEQUENCE IN A SPREAD SPECTRUM COMMUNICATIONS TRANSCEIVER

(75) Inventors: Dan Raphaeli, Kfar Saba (IL); Oren Kaufman, Beer Sheva (IL); Evgeny Bassin, Beer Sheva (IL); Boris Zarud, Beer Sheva (IL)

(73) Assignee: Yitran Communications Ltd, Beersheva (IL)

( * ) Notice: Subject to any disclaimer, the term of this patent is extended or adjusted under 35 U.S.C. 154(b) by 624 days.

(21) Appl. No.: 10/829,532

(22) Filed: Apr. 21, 2004

(65) Prior Publication Data

US 2004/0202229 A1   Oct. 14, 2004

Related U.S. Application Data

(62) Division of application No. 09/933,065, filed on Aug. 20, 2001, now Pat. No. 6,727,790.

(51) Int. Cl.
*H04I 7/00* (2006.01)
(52) U.S. Cl. .................................. 375/366; 370/513
(58) Field of Classification Search ................ 375/363, 375/359, 365, 366, 130, 145–146, 149; 370/503–505, 370/513–514, 517
See application file for complete search history.

(56) References Cited

U.S. PATENT DOCUMENTS

| | | | | |
|---|---|---|---|---|
| 4,860,323 A | 8/1989 | Malter | ......................... | 375/111 |
| 5,132,986 A | 7/1992 | Endo et al. | ................... | 375/142 |
| 5,444,697 A | 8/1995 | Leung et al. | ................ | 370/207 |
| 5,574,754 A | 11/1996 | Kurihara et al. | ............. | 375/367 |
| 5,638,362 A | 6/1997 | Dohi et al. | ................... | 370/342 |
| 5,832,029 A | 11/1998 | Minura | ........................ | 375/208 |
| 6,064,695 A | 5/2000 | Raphaeli | ...................... | 375/230 |
| 6,088,406 A | 7/2000 | Suzuki | ......................... | 375/343 |
| 6,188,679 B1 | 2/2001 | Sato | ............................ | 370/335 |
| 6,345,045 B1 | 2/2002 | Yanagi | ........................ | 370/342 |
| 6,424,673 B1 | 7/2002 | Chen et al. | ................... | 375/149 |
| 6,542,478 B1 * | 4/2003 | Park | ............................ | 370/308 |
| 6,614,864 B1 | 9/2003 | Raphaeli et al. | ............. | 375/371 |
| 6,865,177 B1 * | 3/2005 | Park et al. | .................... | 370/350 |

FOREIGN PATENT DOCUMENTS

| | | |
|---|---|---|
| JP | 08-130526 | 5/1996 |
| WO | WO 01/28146 A1 | 4/2001 |

* cited by examiner

*Primary Examiner*—Jean B Corrielus
(74) *Attorney, Agent, or Firm*—Zaretsky Patent Group PC; Howard Zaretsky

(57) ABSTRACT

A novel and useful acquisition and synchronization mechanism for spread spectrum communication systems whereby a synchronization sequence comprising a plurality of known symbols spaced apart by predefined time delay intervals is transmitted as the start of packet signal. At the transmitter, a synchronization sequence is transmitted at the beginning of each packet. A synchronization sequence is generated which includes a plurality of symbols with predefined time gaps between each of the symbols. Multiple synchronization sequences may be generated wherein each sequence comprises a unique set of time delays or gaps between each of the symbols. Each set of unique time delays or gaps between symbols of a sequence is stored as a synchronization sequence gap template in memory. When required to generate a synchronization sequence, the sequence generator outputs the plurality of synchronization symbols and inserts a specific time delay between each of the symbols in accordance with the contents of the gap template for the particular synchronization sequence.

27 Claims, 8 Drawing Sheets

METHOD AND APPARATUS FOR GENERATING A SYNCHRONIZATION SEQUENCE IN A SPREAD SPECTRUM COMMUNICATIONS TRANSCEIVER

REFERENCE TO RELATED APPLICATIONS

This application is a divisional of U.S. application Ser. No. 09/933,065, filed Aug. 20, 2001, entitled "Acquisition of Synchronization in a Spread Spectrum Communications Transceiver," now U.S. Pat. No. 6,727,790.

FIELD OF THE INVENTION

The present invention relates generally to data communication systems and more particularly relates to a method and apparatus for generating a synchronization sequence in a spread spectrum communications transceiver.

BACKGROUND OF THE INVENTION

The use of spread spectrum communications techniques to improve the reliability and security of communications is well known and is becoming increasingly common. Spread spectrum communications transmits data utilizing a spectrum bandwidth that is much greater than the bandwidth of the data to be transmitted. This provides for a more reliable communication in the presence of high narrowband noise, spectral distortion and pulse noise, in addition to other advantages. Spread spectrum communication systems typically utilize correlation techniques to identify an incoming received signal.

Spread spectrum communications systems were used for use in military environments to overcome high-energy narrowband enemy jamming. In commercial or home environments, they may be used to achieve reliable communication on noise media such as the AC power line. In particular, certain home electrical appliances and devices can potentially be very disruptive of communications signals placed onto the power line. For example, electronic dimming devices can place large amounts of noise onto the power line since these devices typically employ triacs or silicon controlled rectifiers (SCRs) to control the AC waveform in implementing the dimming function.

A communication medium such as the AC power line may be corrupted by fast fading, unpredictable amplitude and phase distortion and additive noise. In addition, communication channels may be subjected to unpredictable time varying jamming and narrowband interference. In order to transmit digital data over such channels it is preferable to use as wide a bandwidth as possible for transmission of the data. This can be achieved using spread spectrum techniques.

The spread spectrum receiver is required to perform synchronization that is commonly achieved using some form of acquisition method optionally in combination with a tracking loop or other tracking mechanism. In a noisy unpredictable environment such as the AC power line, the tracking loop typically fails frequently causing loss of information. Communication systems to overcome these problems are large, complex and expensive.

Synchronization of signals between the transmitter and the receiver that are communicating with each other in a spread spectrum communication system is an important aspect of the process of transmitting signals between them. Synchronization between transmitter and receiver is necessary to allow the despreading of the received signals using a spreading code that is synchronized between them so that the originally transmitted signal can be recovered from the received signal. Synchronization is achieved when the received signal is accurately timed in both its spreading code pattern position and its rate of chip generation with respect to the receiver's spreading code.

One of the problems associated with synchronization is that the techniques used to synchronize two signals are relatively expensive to implement. In communication systems having sophisticated and relatively expensive central communication sites which serve a plurality of relatively inexpensive remote communication sites, it is desirable to reduce the cost of synchronization systems in the remote communication sites while not increasing the cost of the central communication sites.

In a communications transceiver, it is desirable that the acquisition mechanism be more reliable that any error correction code used for the data portion of the packet. In other words, it is preferable to declare synchronization correctly and not be able to correctly decode the packet data than to miss the entire packet altogether because of a weak acquisition algorithm.

Further, it is desirable that the acquisition algorithm has as low a probability as possible of false synchronization from noise, e.g., less than once in 5 seconds. The acquisition mechanism should be capable of utilizing more than one synchronization sequence whereby the probability of synchronization from another sequence is minimized.

SUMMARY OF THE INVENTION

Accordingly, the present invention provides a novel and useful mechanism for generating a synchronization sequence in a spread spectrum communications transmitter. The mechanism of the present invention is useful in communication systems characterized by shared media such as networks that use power line carrier communications. In general, the invention is applicable where a plurality of stations are connected to a shared communication media whereby receiving stations must acquire synchronization on a start of packet signal transmitted by transmitting stations at the beginning of each packet.

An improved acquisition mechanism for spread spectrum communication systems is provided whereby a synchronization sequence comprising a plurality of known symbols spaced apart by predefined time delay intervals is transmitted as the start of packet signal. At the transmitter, a synchronization sequence is transmitted at the beginning of each packet. A synchronization sequence is generated which includes a plurality of symbols with predefined time gaps between each of the symbols. Multiple synchronization sequences may be generated wherein each sequence comprises a unique set of time delays or gaps between each of the symbols. Each set of unique time delays or gaps between symbols of a sequence is stored as a synchronization sequence gap template in memory. When required to generate a synchronization sequence, the sequence generator outputs the plurality of synchronization symbols and inserts a specific time delay between each of the symbols in accordance with the contents of the gap template for the particular synchronization sequence.

At the receiver, the received signal is correlated against the synchronization sequence using the predefined gaps or time delay intervals inserted between the symbols. The received signal is first passed through a linear correlator which functions to generate a correlation peak for each symbol received.

The expected position of each correlation peak is then calculated and compared to the positions of the correlation peaks received. If the number of matches exceeds a threshold, synchronization is declared.

The acquisition algorithm is adapted to search for matching correlation peaks while considering zero or more received symbols in error. Further, the algorithm permits a match if the expected correlation position is within a predefined delta of the received correlation peak. If unsuccessful, the acquisition algorithm repeats in an attempt to correlate each predefined synchronization sequence to the received correlation peaks.

Once synchronization is declared, a synchronization quality factor is calculated as a function of the number of matches and the number of correlation peaks whose value exceeds a threshold. If subsequent synchronizations are declared, the quality factors are compared and if the latest quality factor is greater, the previous packet is dropped and the current packet is received. Note that the process of comparing synchronization quality and dropping the previous packet in favor of the next packet is performed until the header CRC checksum field is verified. After the header CRC is checked and verified, the receiver is locked into receiving the current packet.

The acquisition mechanism provides for multiple synchronization sequences wherein the cross correlation of the sequences is minimized in order to reduce the probability of false detection with another sequence. The use of multiple synchronization sequences permits additional information to be transmitted to the receiving station. For example, the different sequences may be adapted to indicate to the receiver the particular packet type or modulation scheme used for that packet transmission.

Many aspects of the previously described invention may be constructed as software objects that execute in embedded devices as firmware, software objects that execute as part of a software application on a computer system running an operating system such as Windows, UNIX, LINUX, etc., an Application Specific Integrated Circuit (ASIC) or functionally equivalent discrete hardware components.

There is thus provided in accordance with the present invention, a method of generating a start of packet synchronization sequence for use in a transmitter, the method comprising the steps of generating a plurality of N symbols to be transmitted in the synchronization sequence, generating N-1 predetermined signals, inserting one of the N-1 predetermined signals after each of the first N-1 symbols in the synchronization sequence and wherein N is a positive integer.

There is also provided in accordance with the present invention, a method of generating a start of packet synchronization sequence for use in a code shift keying (CSK) based transmitter, the method comprising the steps of generating a plurality of symbols of known shift rotation to be transmitted in the synchronization sequence, inserting a predetermined time delay between each of the symbols and wherein the predetermined time delays inserted between the symbols define a unique synchronization sequence gap template.

There is further provided in accordance with the present invention, a transmitter for use in a spread spectrum communications system comprising synchronization sequence generator adapted to generate a synchronization sequence, the synchronization sequence representing a plurality of synchronization symbols with predetermined time delays inserted therebetween, an encoder adapted to determine a shift index to be applied to a spreading waveform, the shift index determined based on the synchronization sequence, a spreading waveform generator adapted to generate a spreading waveform signal in accordance with the shift index and wherein delays between spreading waveform signals are determined by the predetermined time delays in the synchronization sequence.

There is also provided in accordance with the present invention, a communications station for transmitting and receiving signals to and from other stations connected over a shared communications media based network comprising a coupling circuit for generating a receive signal received over the network and for outputting a transmit signal onto the network, a transmitter adapted to modulate a synchronization sequence and data to be transmitted in accordance with a modulation scheme so as to generate the transmit signal therefrom, wherein the transmitter comprises means for generating a plurality of symbols of known shift rotation to be transmitted in the synchronization sequence and means for inserting a predetermined time delay between each of the symbols, a receiver adapted to demodulate the receive signal in accordance with the modulation scheme so as to generate a receive data signal therefrom, a media access control (MAC) circuit adapted to interface an application processor to the shared communications media and the application processor adapted to control the operation of the transmitter, receiver and MAC and to provide an interface between the MAC and an external host.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
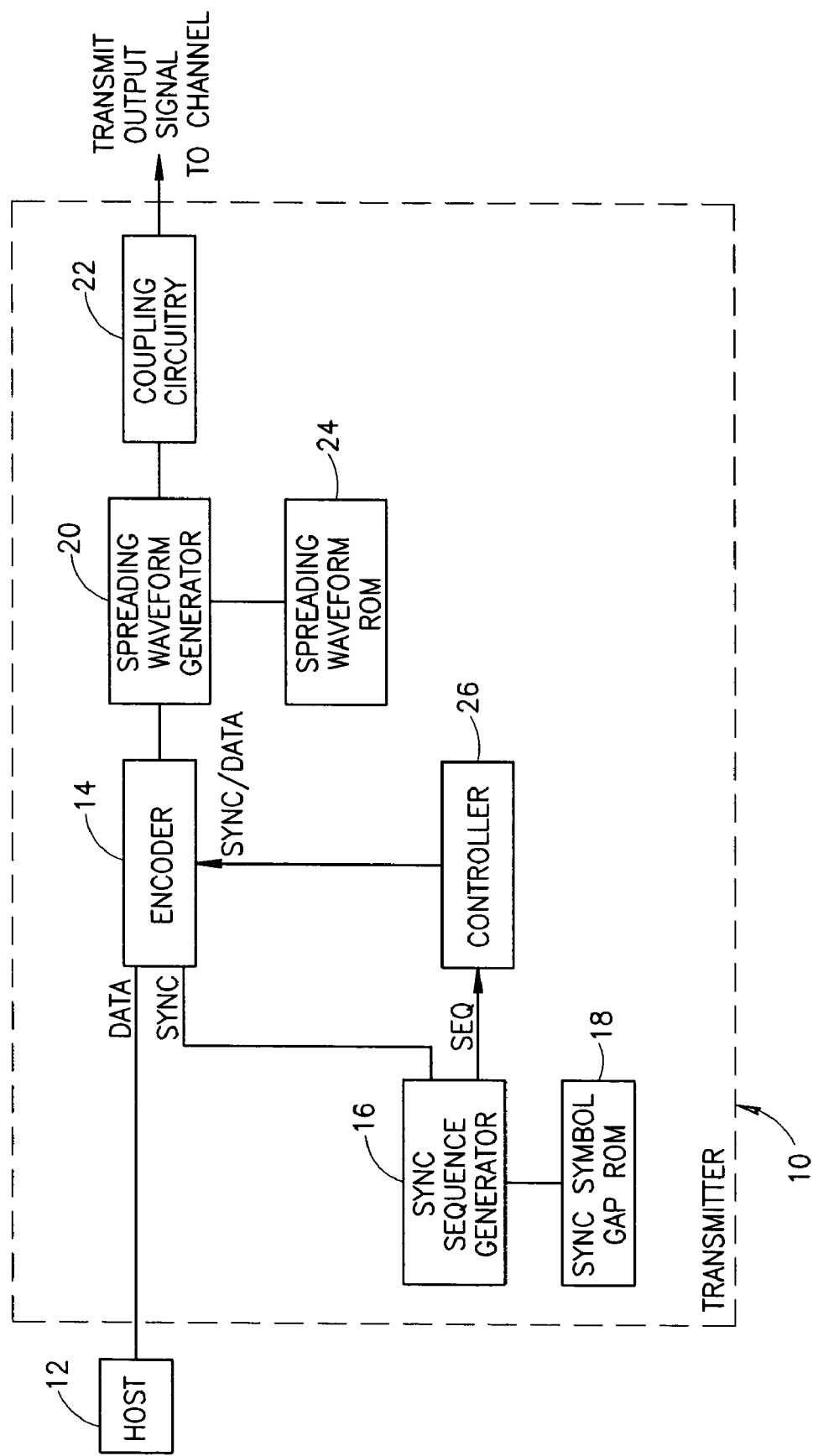
FIG. 1 is a diagram illustrating an example transmitter adapted to generate a synchronization sequence constructed in accordance with the present invention.

The following notation is used throughout this document.

| Term | Definition |
| --- | --- |
| AC | Alternating Current |
| ASIC | Application Specific Integrated Circuit |

| Term | Definition |
|---|---|
| BPF | Band Pass Filter |
| CD | Carrier Detect |
| CRC | Cyclic Redundancy Code |
| CSK | Code Shift Keying |
| CSMA | Carrier Sense Multiple Access |
| DCSK | Differential Code Shift Keying |
| DSP | Digital Signal Processor |
| EEROM | Electrically Erasable Read Only Memory |
| FPGA | Field Programmable Gate Array |
| IR | Infrared |
| ISO | International Standards Organization |
| MAC | Media Access Control |
| OSI | Open Systems Interconnect |
| PBX | Private Branch Exchange |
| PLC | Power Line Carrier |
| RAM | Random Access Memory |
| RF | Radio Frequency |
| ROM | Read Only Memory |
| SCR | Silicon Controlled Rectifier |
| UST | Unit Symbol Time |

Detailed Description of the Invention

The present invention is a novel and useful mechanism for generating a synchronization sequence in a spread spectrum communications transmitter. The mechanism of the present invention is useful in communication systems characterized by shared media such as networks that use power line carrier communications. In general, the invention is applicable where a plurality of stations are connected to a shared communication media whereby receiving stations must acquire synchronization on a start of packet signal transmitted by transmitting stations at the beginning of each packet.

An improved acquisition mechanism for spread spectrum communication systems is provided whereby a synchronization sequence is generated at the transmitter. The synchronization sequence includes a plurality of symbols with predefined time gaps between each of the symbols and is transmitted at the beginning of each packet as the start of packet signal. Multiple synchronization sequences may be generated wherein each sequence comprises a unique set of time delays or gaps between each of the symbols. Each set of unique time delays or gaps between symbols of a sequence is stored as a synchronization sequence gap template in memory. When required to generate a synchronization sequence, the sequence generator outputs the plurality of synchronization symbols and inserts a specific time delay between each of the symbols in accordance with the contents of the gap template for the particular synchronization sequence.

At the receiver, the received signal is correlated against the synchronization sequence using the predefined gaps or time delay intervals inserted between the symbols. The received signal is first passed through a linear correlator which functions to generate a correlation peak for each symbol received. The expected position of each correlation peak is then calculated and compared to the positions of the correlation peaks received. If the number of matches exceeds a threshold, synchronization is declared.

For purposes of this specification, the term 'station,' 'node' or 'communication node' shall be taken to mean any network entity, implemented in either hardware, software or a combination of hardware and software, which may be the endpoint of a call, link or connection within a shared media based network. The network may comprise any type of shared network or media including but not limited to power line carrier based networks, twisted pair networks, IR wireless networks, RF wireless networks, optical fiber ring networks, etc. The term 'call,' 'link' or 'connection' shall be taken to mean any communication path that is established between at least two nodes for the purpose of communication therebetween. The term phase unit is defined as a sample time in the receiver. A sample time is any suitable period that the signal or correlator output can be sampled without loosing information.

The synchronization sequence generation mechanism of the present invention is especially suited for use in a spread spectrum data communications system that utilizes the Differential Code Shift Keying (DCSK) or non-differential Code Shift Keying (CSK) modulation technique. Such communications systems are applicable to relatively noisy environments such as the AC power line.

In a CSK transmission system, the data is transmitted in the form of time shifts between consecutive circularly rotated waveforms of length T which are referred to as spreading waveforms, i.e., spread spectrum correlator sequence waveforms. The spreading waveforms can comprise any type of waveform that has suitable auto correlation properties. During each symbol period, referred to as a unit symbol time (UST), a plurality of bits are transmitted. The symbol period is divided into a plurality of shift indexes with each shift index representing a particular bit pattern. The information, i.e., bit pattern, is conveyed by rotating the spreading waveform by a certain amount corresponding to the data to be transmitted. The data is conveyed in the degree of rotation or circular shift applied to the spreading waveform before it is transmitted. Note that the spreading waveform may comprise any suitable waveform such as a chirp, pseudorandom sequence, etc.

In a CSK system, the data is conveyed in the absolute shift assigned to the spreading waveform. In a DCSK system, the data is conveyed in the shift differential between consecutive symbols. The synchronization scheme of the present invention is applicable to both CSK and DCSK transmission systems.

Upon reception by the receiver, the signal is input to a matched filter having a template of the spreading waveform pattern to detect the amount of rotation (or circular shift) within the received signal for each symbol. The received data is fed into a cyclic correlator wherein the contents are periodically circularly shifted and a correlation output generated therefrom. Cyclic correlation may be achieved by inputting the received data to a shift register whose output is fed back to its input and circularly rotating, i.e., shifting, the contents of the shift register. The output of the shift register is input to a matched filter. For each bit shift or rotation, the matched filter generates a correlation sum. A shift index is determined for each UST corresponding to the shift index that yields the maximum (or minimum) correlation sum. Differential shift indexes are generated by subtracting the currently received shift index from the previously received shift index. The differential shift index is then decoded to yield the originally transmitted data.

Spread spectrum communications systems based on DCSK or CSK modulation are described in more detail in U.S. Pat. No. 6,064,695, to Raphaeli, entitled "Spread Spectrum Communication System Utilizing Differential Code Shift Keying," incorporated herein by reference in its entirety.

Transmitter with Synchronization Sequence Generator

Transmitting stations transmit data in the form of packets to receiving stations. Each packet is preceded by a synchronization sequence comprising a predetermined number of symbols having predefined gaps or time delays between each symbol. The length of the synchronization sequence can be any suitable number of symbols such that receiving stations are able to synchronize with the transmitting station. For illustration purposes only, in the example presented herein, the synchronization sequence comprises a sequence of seven symbols of known shift rotation, e.g., zero shift symbols. The seven symbols are transmitted whereby a specific predetermined time delay is inserted between each of the symbols. The particular time delays inserted between the symbols define a unique synchronization sequence gap (i.e. time delay) template. Different synchronization sequences have different time delay templates. The intervals inserted between synchronization symbols are used by the receiver in the receiving station to determine the specific packet type used in the transmission. Knowledge of the type of packet is crucial to be able to correctly decode the remainder of the packet.

A diagram illustrating an example transmitter adapted to generate a synchronization sequence constructed in accordance with the present invention is shown in FIG. 1. The transmitter, generally referenced 10, is typically part of a modem transceiver located in each station. In the example provided, the modem transceiver is adapted to communicate using the CSK modulation scheme described hereinabove. Note that one skilled in the communication arts may apply the techniques of the present invention to other modulation techniques as well.

Data to be transmitted is provided by an external host 12 and input to an encoder 14. The encoder functions to determine the amount of rotation to be applied to the output spreading waveform. The amount of rotation is represented as a shift index. The shift index is input to the spreading waveform generator 20 which functions to generate the spreading waveform signal in accordance with the shift index. The spreading waveform itself is stored in a spreading waveform ROM 24 which contains the digitized representation of the spreading waveform frequency waveform. The spreading waveform is read out starting from an initial point corresponding to the shift index. Starting from the initial point, the entire spreading waveform is circularly read out and transmitted onto the channel via the coupling circuitry 22.

The coupling circuitry comprises the circuitry required to couple the signal onto the physical channel. For example, the coupling circuitry comprises a D/A converter whose analog output is first filtered by a band pass filter (BPF) having a suitable pass band in accordance with the signal width. The output of the BPF is then amplified by an output amplifier wherein the output of the amplifier comprises the transmit output signal.

The transmitter functions not only to transmit data but also the synchronization sequence which forms the start of packet signal that is transmitted at the beginning of each packet. The synchronization sequence is generated by the synchronization sequence generator 16 whose output is input to the encoder along with the data received from the host. The encoder is adapted to process either the data from the host or synchronization sequence from the synchronization sequence generator in accordance with a sync/data control signal output by a controller 26.

When in synchronization mode, the encoder is operative to generate shift indexes in accordance with the input synchronization sequence. In accordance with the invention, the synchronization sequence comprises a plurality of symbols with predefined time gaps between each of the symbols. Multiple synchronization sequences may be generated wherein each sequence comprises a unique set of time delays or gaps between each of the symbols. One of a plurality of synchronization sequences may be selected using the SEQ control signal output from the controller.

Each set of unique time delays or gaps between symbols of a sequence is stored as a sync sequence gap template in a ROM or other table means 18. When required to generate a synchronization sequence, the sequence generator outputs the plurality of synchronization symbols (e.g., symbols with zero or other rotation to both transmitter and receiver) and inserts a specific time delay between each of the symbols in accordance with the contents of the gap template for the particular synchronization sequence to be transmitted. Note that for the example case of seven symbols per synchronization sequence, the sync sequence gap table is adapted to store six time delays per synchronization sequence. The time delays may be stored in any suitable format, e.g., units of time, clocks, fractions of a UST, phase clock ticks, etc.

Figure 4:
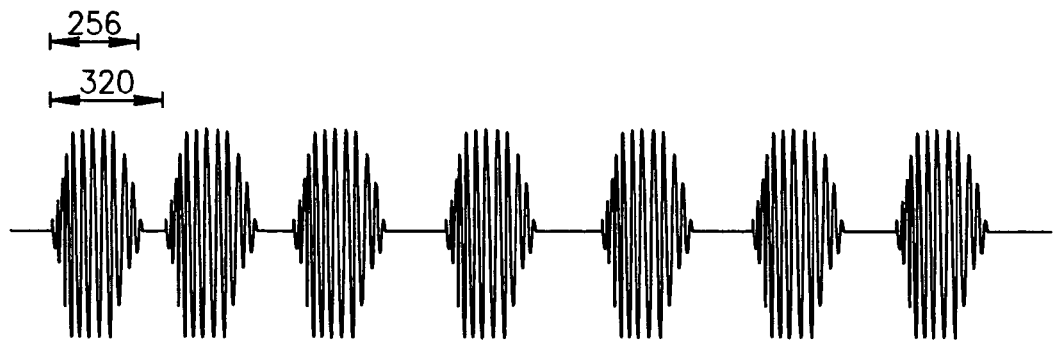
FIG. 4 is a diagram illustrating an example synchronization sequence transmission signal comprising a plurality of symbols separated by predetermined time delays.

A diagram illustrating an example synchronization sequence transmission signal comprising a plurality of symbols separated by predetermined time delays is shown in FIG. 4. Each symbol has a fixed length of one UST which in this example is equivalent to 256 receiver correlator phase units (i.e. sample times) which corresponds to 800 µs. The time delay inserted between each symbol has a maximum length of 700 µs. In the example shown, the first delay inserted after the first symbol is 64 phase units or 200 µs.

In accordance with the invention, a set of five orthogonal synchronization sequences are provided wherein each sequence is used to convey information about the packet type used in the particular transmission. Each packet type corresponds to a different synchronization sequence. The five synchronization sequences are listed below in Table 1.

TABLE 1

Synchronization Sequence Time Delay Intervals

| Sequence Number | Packet Type | Time Delays |
|---|---|---|
| 1 | 1 | [10, 6, 12, 9, 8, 5] |
| 2 | 2 | [4, 5, 14, 12, 11, 9] |
| 3 | 3 | [6, 4, 11, 13, 5, 10] |
| 4 | 4 | [8, 7, 4, 9, 5, 11] |
| 5 | 5 | [11, 5, 7, 9, 6, 6] |

The packet types may correspond, for example, to packets of different data rates, ACK packets, etc. The different synchronization sequences may be used to convey any type of information depending on the implementation and is not limited to conveying the modulation or packet type. The time delays for each sequence are presented as multiples of 50 µs. Thus, the delay inserted between the third fourth symbol for sequence #3 is 550 is. The total duration of the synchronization sequence is equal to the sum of the time delays and the sum of the seven symbol durations. Note that the sum of the time delays for any of the sequences above does not exceed 64 (i.e. 4 USTs or 3,200 µs). Thus, the maximum duration for the synchronization sequence is 11 USTs comprised of the seven symbol USTs plus the four USTs of intersymbol delays.

Note that the gap may be zero and may be larger than 14. In addition, the mechanism may be implemented using any type of signal and is not limited to the use of gaps. Further, variable length symbols may be used whereby correlation is performed on only a portion of the received symbol. In other words, energy may be added before or after the transmitted symbol wherein the correlation length remains fixed. Alternatively, the symbols may be rotated rather than having zero shift. In this case, the rotation causes the correlation point of the symbol to move and causes the correlation value to be reduced in proportion to the amount of rotation applied.

Since the symbol length is 800 μs or 256 phase units (i.e. correlation samples), the synchronization sequence time delays may be rewritten in terms of correlation phase units as presented below in Table 2. Each symbol duration is comprised of 256+(time delay * 16) phase units where the time delay is from Table 1 above.

TABLE 2

Synchronization Sequence Time Delay Intervals

| Sequence Number | Symbol Durations |
|---|---|
| 1 | [416, 352, 448, 400, 384, 336] |
| 2 | [320, 336, 480, 448, 432, 400] |
| 3 | [352, 320, 432, 464, 336, 416] |
| 4 | [384, 368, 320, 400, 336, 432] |
| 5 | [432, 336, 368, 400, 352, 352] |

Note that the sync symbol gap ROM in the transmitter may be adapted to store the time delays, symbol durations or any other value that yields the duration of each symbol and the gap to be inserted between each of the symbols. A set of time delays, symbol durations, etc. is provided for each unique synchronization sequence to be transmitted.

Figure 3:
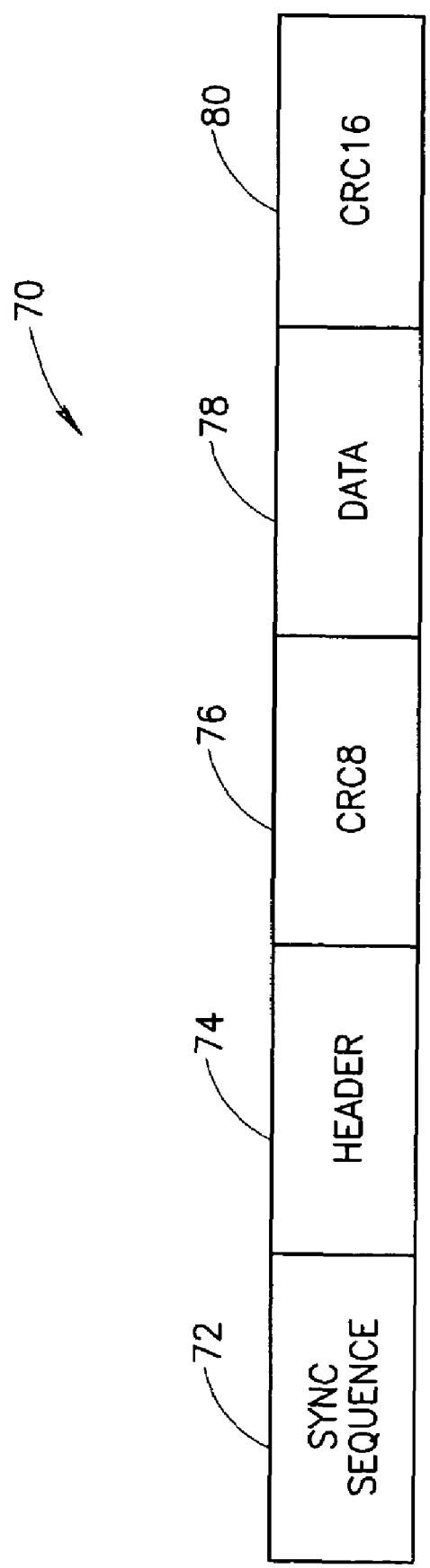
FIG. 3 is a diagram illustrating the format of an example packet comprising a synchronization sequence.

As described above, the synchronization sequence is transmitted at the start of each packet before the packet data is sent. A diagram illustrating the format of an example packet comprising a synchronization sequence is shown in FIG. 3. The packet, generally referenced 70, comprises the synchronization sequence 72 at the start of the packet, a packet header field 74, CRC8 error checking value 76, data payload 78 and CRC16 error checking field 80. As described in more detail infra, acquisition circuits in the receiver function to acquire synchronization on the synchronization sequence. Once synchronization is achieved, data decoding can proceed beginning with the packet header.

Once the sync sequence and corresponding shift indexes are determined, the spreading waveform is generated in accordance with the shift index (step 186). The packet, including sync sequence and data payload, is assembled for transmission (step 188) and the signal is coupled to the channel (step 190).

Receiver with Acquisition and Synchronization Circuit

Figure 2:
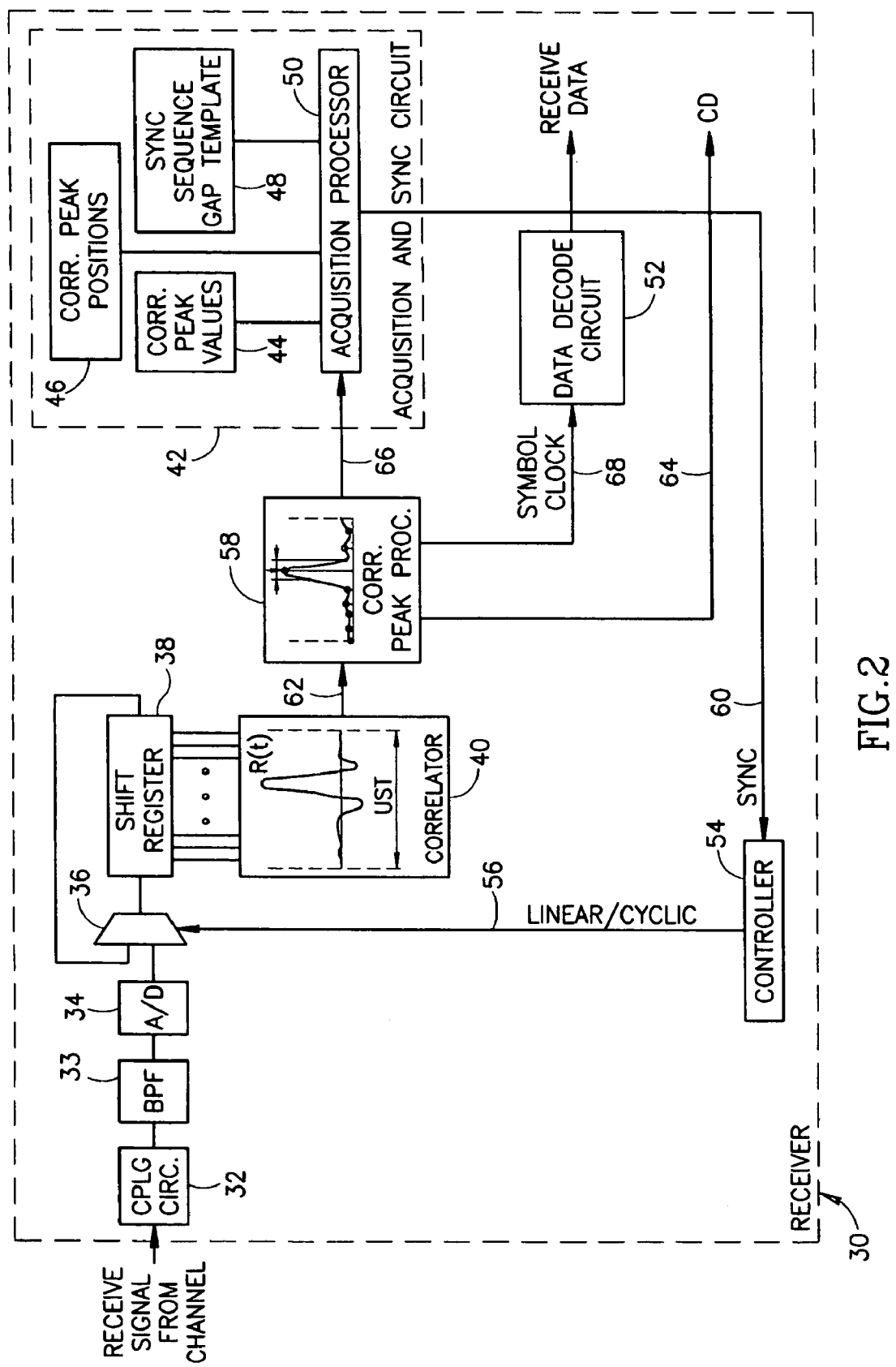
FIG. 2 is a diagram illustrating an example receiver comprising an acquisition and synchronization circuit constructed in accordance with the present invention.

A diagram illustrating an example receiver comprising an acquisition and synchronization circuit constructed in accordance with the present invention is shown in FIG. 2. The receiver, generally referenced 30, performs both data decoding and acquisition of synchronization on the start of packet synchronization sequence transmitted before each packet. The signal received from the channel media is input to a channel coupling circuit 32 which interfaces the receiver to the powerline, etc. The received signal is then filtered by a band pass filter (BPF) 33 having suitable frequency characteristics for the band of interest. The bandwidth of the band pass filter (BPF) is wide enough to receive the range of frequencies transmitted within the spreading waveform. The output of the filter is input to a one-bit A/D converter 34. The A/D converter may comprise a comparator in combination with a sampler clocked at a suitable sampling frequency.

The output of the A/D converter is input to one of two inputs of multiplexer (mux) 36. The output of the multiplexer is input to a shift register 38. For illustrative purposes only, the length of the shift register is 256 bits long each. The output of the shift register is input to a correlator 40. The correlator is implemented using a matched filter which functions to recognize the spreading waveform pattern. The spreading waveform pattern is stored as a template within the correlator and is used to detect the presence of spreading waveforms from the received signal. The serial output of the shift register wraps around to the second input of the multiplexer. The multiplexer select output is controlled by a linear/cyclic control signal output by the controller 54.

The correlator circuit is capable of operating in either a linear or cyclic mode. For acquisition and synchronization, the correlator is set to operate in a linear mode of operation. In linear mode operation, the multiplexer is set to select the output of the A/D converter as the input to the shift register. Each bit output of the A/D converter is clocked into the shift register and the parallel output of the shift register is input to the correlator. Within the correlator, each bit input to the correlator is multiplied by a corresponding bit from the template. All 256 products are summed to form the output 62 of the correlator.

The output of the linear correlator is input to a correlation peak processor 58 functioning as a $I^2+Q^2$ type energy detector. The function of the correlation peak processor comprises performing a search over a UST period for the maximum correlation peak and generating a signal 66 therefrom, generating the symbol clock 68 and detecting the presence of carrier and generating a carrier detect (CD) signal 64 therefrom. The CD signal is derived from the results of the correlation and is declared if the correlation results exceed a threshold.

The output signal 66 of the peak processor is input to the acquisition processor circuit 50 in the acquisition and sync circuit 42. The acquisition process functions to receive and store the correlation peak data in a memory table 44 which may comprise any suitable memory means, e.g., RAM, etc. Similarly, the positions of the correlation peaks are also stored in a memory table 46. A sync sequence template memory (e.g., ROM, etc.) 48 stores one or more sets of time delays or intersymbol gaps, wherein each set corresponds to a different synchronization sequence. The acquisition process is described in more detail infra.

Once synchronization is achieved, the controller switches the mode of operation of the correlator to cyclic correlation wherein the contents of the shift register are loaded and circularly shifted for a full UST cycle. The shift yielding the maximum correlation peak is decoded by data decode circuit 52 and the receive data output therefrom. The receiver has knowledge of the location of the symbols (i.e. USTs) in the receive signal from the output of the synchronization signal 60 output of the acquisition processor and used by the controller to provide the appropriate timing time the circular correlation process.

Acquisition and Synchronization Mechanism

In accordance with the mechanism of the present invention, correlation of the received signal is performed with the entire synchronization sequence. Correlation of the received signal with the synchronization sequence, however, is applied to the signal output from the linear correlator 40 by the acquisition processor 50. Processing a received signal in the form of the synchronization sequence transmission signal shown in FIG. 4, yields an output signal from the linear correlator comprising a plurality of peaks whereby the distance between the peaks correspond to the time delays injected between each of the symbols of the synchronization sequence. This distances between the peaks are equal to 256 phase units plus the delay as defined by the particular synchronization sequence template used to generate the transmission. Thus, the main function of the acquisition processor is to search for correlation peaks in their respective correct positions, determine the number of matching peaks and decide whether to declare synchronization or not. In other words, the acquisition processor decides whether or not a transmission is currently being received, and if so to proceed to decode the remainder of the packet.

Figure 5:
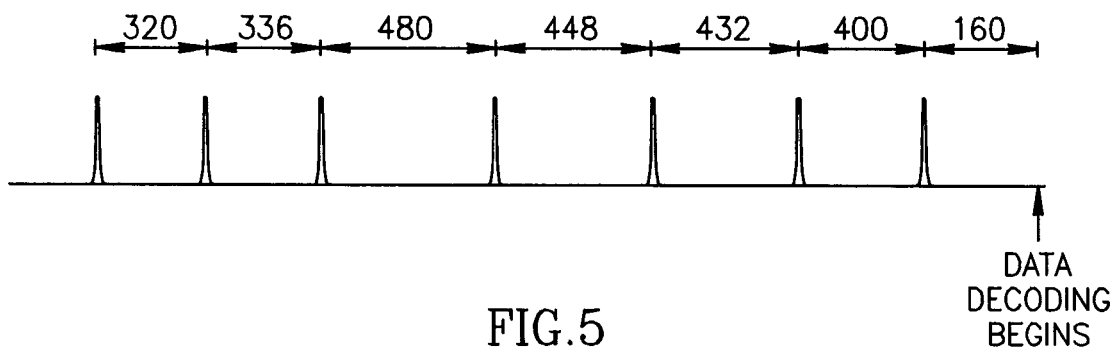
FIG. 5 is a diagram illustrating the corresponding correlation peaks generated in response to the synchronization sequence of FIG. 4.

A diagram illustrating the corresponding correlation peaks generated in response to the synchronization sequence of FIG. 4 is shown in FIG. 5. The synchronization sequence shown corresponds to Sequence Number 2 in Tables 1 and 2 above. Passing the transmission signal of Sequence Number 2 through the linear correlator results in a sequence of correlation peaks spaced apart by distances in accordance with Sequence number 2. Thus, the six gaps or symbol interval time delays correspond to those in Table 2 for Sequence Number 2.

The synchronization point whereupon data decoding begins is taken 500 μs (i.e. 160 phase units) after the last peak as shown by the vertical arrow. The switching point from linear to cyclic correlation occurs a bit later 1300 μs after the last correlation peak. The 1300 μs time is defined from the time of reception of the last symbol of the synchronization sequence (i.e. location of the correlation peak) plus a 500 μs delay following the peak followed by the first symbol of the data (i.e. 800 μs). Cyclic correlation begins only after the first data symbol has been clocked into the shift register.

Each unique synchronization sequence determines where the seven correlation peaks are expected to be located. The six predefined (i.e. expected) distances between the peaks are stored in the sync sequence gap template in both the transmitter and the receiver. Thus for a synchronization sequence comprising N symbols, N-1 distance differences are stored in both sync sequence gap templates. Note that the maximum length synchronization sequence is 2704 phase units corresponding to 11 USTs. Thus, the number of correlation windows to be applied to the received signal is 11. The term correlation window is defined as the symbol time or UST. Note that alternatively the correlation window may be chosen to be smaller or larger than a UST. If the minimum gap size is zero, for example, the correlation window should be smaller than a UST.

Figure 6:
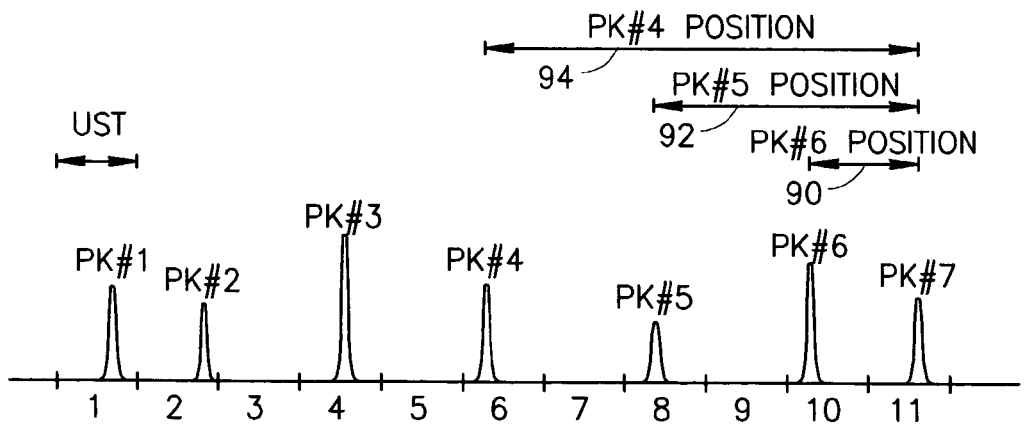
FIG. 6 is a diagram illustrating the output of the linear correlator in response to an example received signal corresponding to the synchronization sequence transmission signal of FIG. 4.

The acquisition mechanism will now be described in more detail. For illustration purposes only, a sample received signal yielding a sequence of correlation peaks is used. A diagram illustrating the output of the linear correlator in response to a sample received signal corresponding to the synchronization sequence transmission signal of FIG. 4 is shown in FIG. 6. The ticks along the x-axis correspond to the 11 UST windows. The individual peaks are labeled PK#1 through PK#7 wherein PK#7 is generated later in time than PK#1.

The acquisition algorithm is operative to compare the position of each received correlation peak against the expected position calculated in accordance with the time delays of the synchronization sequence symbol gap template. The expected positions are calculated with reference to the last received correlation peak, assuming it is in the correct position. For example, the expected position of PK#6 is calculated by subtracting gap #6 of the gap template from the position of received correlation PK #7. This distance is represented by reference numeral 90. Similarly, the expected position of PK#5 is calculated by subtracting the sum of gaps #5 and #6 from the position of PK#7 (distance 92). The expected position of PK#4 is similarly calculated by subtracting the sum of gaps #4, #5 and #6 from the position of PK#7 (distance 94). In this manner the expected distances of peaks PK#1 through PK#6 are calculated. Synchronization is declared if a sufficient number of matching peaks are found. If synchronization is not found, the algorithm repeats assuming the previous peak (i.e. PK#6) is correct, continuing until PK#4.

Figure 7A:
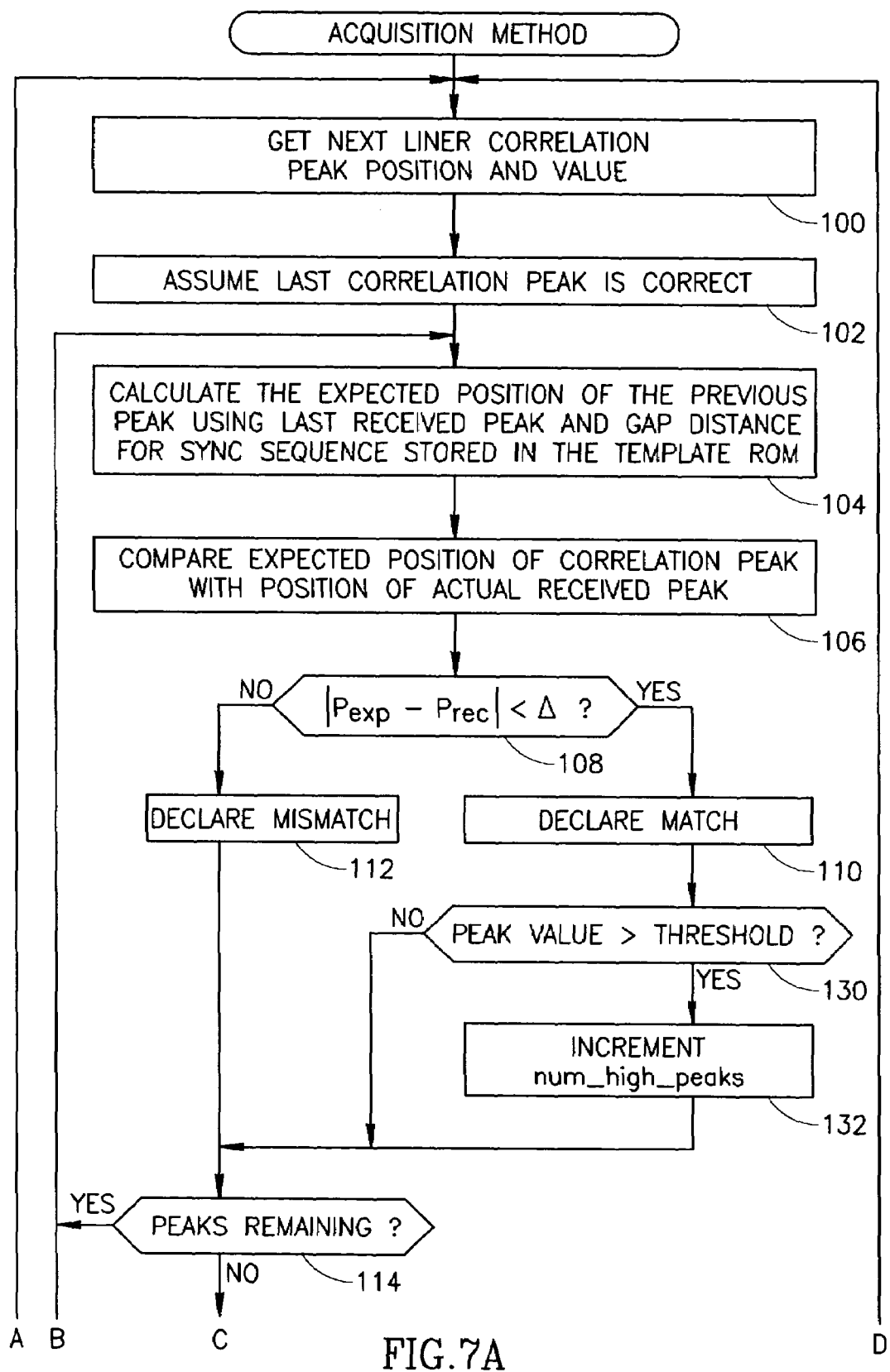
FIGS. 7A and 7B are a flow diagram illustrating the acquisition method of the present invention in more detail.
Figure 7B:
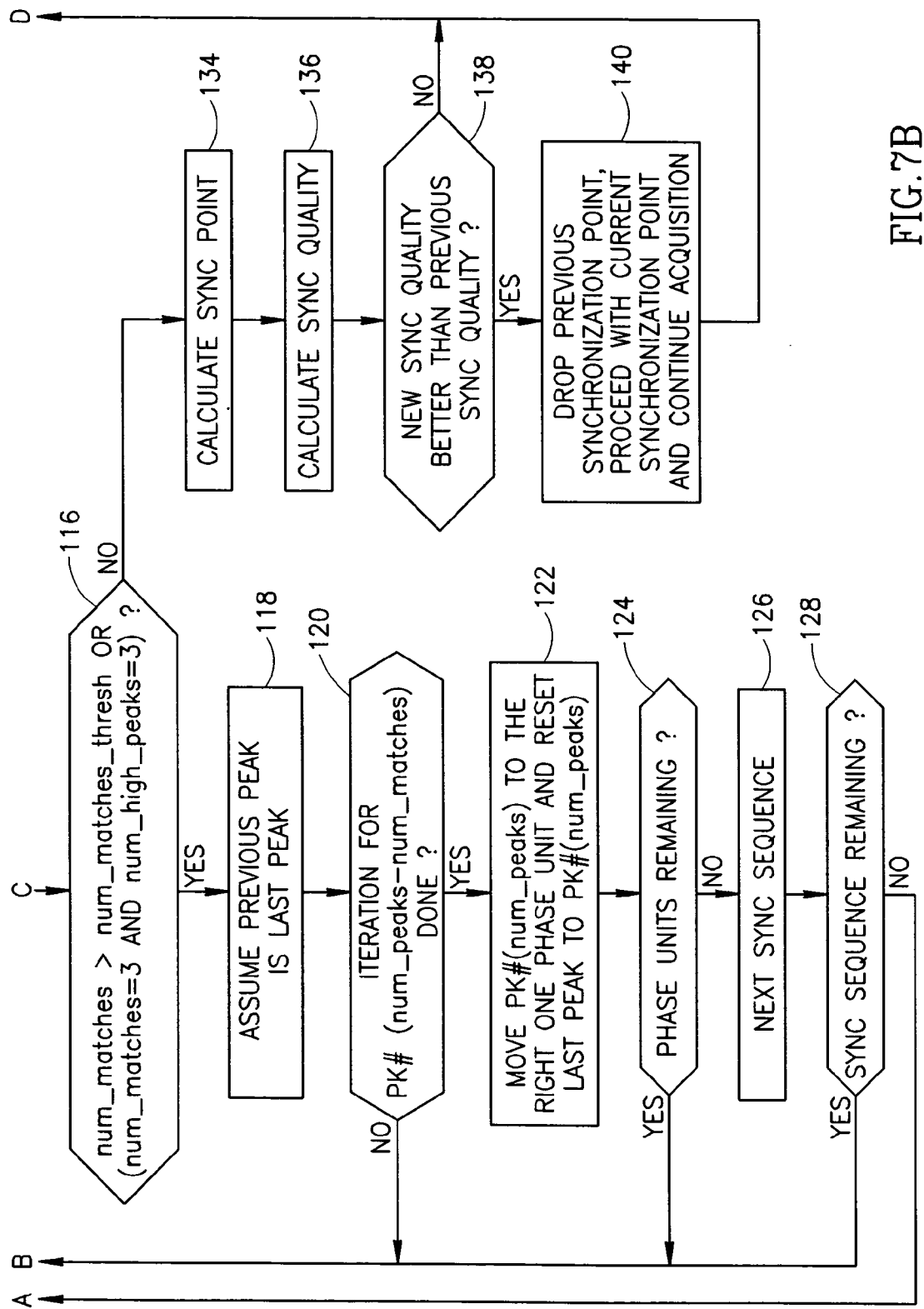

A flow diagram illustrating the acquisition method of the present invention in more detail is shown in FIGS. 7A and 7B. For each new correlation peak output of the linear correlator, the position and value of the peak are stored in a table in memory (step 100). Each of these two tables is sufficiently large to store 11 entries each corresponding to the possible 11 UST windows for the length of the synchronization sequence. Initially, the algorithm does not start until at least 11 windows have passed.

The algorithm begins with the last received correlation peak which is assumed to be in the correct position (step 102). In the example presented supra, PK#7 is assumed to be in the correct position. For each of the other correlation peaks (i.e. peaks PK#6 through PK#1), the expected position of each peak is calculated with reference to the last received peak (i.e. PK#7) using the gap distance stored in the template for that symbol in the sequence (step 104). The expected positions of the earlier peaks in the sequence are calculated by subtracting the sum of the individual gaps stored in the template making up the distance between the earlier peak and the last received peak from the position of the last received peak. If the result is negative, a window length (i.e. 1 UST or 256 phase units) is added to the position of the received correlation peak. This compensates for the case where a correlation peak was not received in every window period. Since the positions of the correlation peaks are measured relative to the particular window in which they are received, a negative result indicates that at least one window UST passed wherein no correlation peak was received.

The expected position of the correlation peak is then compared with the position of the actual received correlation peak (step 106). The expected (i.e. desired) position $P_{EXP}$ of the correlation peak as derived from the synchronization sequence gap template is then subtracted from the position of the received correlation peak $P_{REC}$ (step 108). If the difference is within a predefined delta, a match is declared (step 110) and a counter num_matches is incremented. If the value of the correlation peak exceeds a peak value threshold (step 130), a num_high_peaks counter is incremented (step 132). If the difference is not within the predefined threshold, a mismatch is declared and the number of mismatches is also tracked (step 112). Note that the delta may be taken in either direction of the expected position, i.e. left or right, however, in the example embodiment presented herein, the delta is taken only to the left of the expected position. The value of the delta in the example presented herein equals 8 phase units. Other values for the delta may also be used depending on the implementation.

The steps of calculating, comparing and determining if a match exists are repeated for each of the remaining correlation peaks (step 114). In the example case where num_peaks equals seven synchronization sequence symbols, the process repeats six times for peaks PK#6 to PK#i. Once the processing for all the peaks is complete, synchronization is declared if num_matches is greater than num_matches_thresh (step 116). In this example, synchronization is declared if four or more matches out of six are found, i.e. num_matches_thresh=3. Synchronization is also declared in the borderline case when (1) num_matches=num_matches_thresh (e.g., number of matches equals 3) and (2) half the matching peaks have correlation values above a threshold (e.g., the value of num_high_peaks equals 3).

If synchronization is declared, the point of synchronization is calculated as described infra (step 134). The synchronization quality factor is also calculated (step 136). If the just calculated synchronization quality is better than the previously calculated synchronization quality (step 138), the previous synchronization point is dropped and reception continues with the current synchronization point (i.e. acquisition process continues) (step 140).

If synchronization is not found (step 116), the symbol corresponding to the last received peak is assumed to have been received in error (step 118) and the algorithm repeats and searches for matching peaks. In the example presented, the symbol corresponding to PK#7 is assumed to have been received in error and PK#6 is considered the last received peak and is assumed to be in the correct position. The expected positions for PK#5 through PK#1 are then calculated with reference to PK #6 and compared to the corresponding received peak positions. As in the previous loop, the same criteria for synchronization apply here as well. If synchronization is not found, the next iteration assumes PK#7 and PK#6 were received in error, followed by the last iteration wherein PK#7, PK#6 and PK#5 are assumed to be received in error.

The iterations continue until peak #(num_peaks-num_matches). If after the last iteration, i.e.

PK#4 in this example, is considered the last received peak (step 120), synchronization has not been found, PK#7 is again considered the last received peak and its position is moved one phase unit to the right (step 122). The algorithm is repeated with the new position for the last received peak or peak #(num_peaks), i.e. PK#7 in this example. If synchronization is not found, the position of the last received peak is moved an additional phase unit to the right and the algorithm repeated. The shifting of the peak position continues up to delta phase units (step 124).

Note that moving one phase unit to the right refers to an advance on the time axis (i.e. later in time) whereas moving one phase to the left refers to a retreat on the time axis (i.e. earlier in time).

Note that this shift of delta phases to the right combined with the permitted delta for the difference between the expected position and the received position to the left of the expected position has the advantage of providing for a ±delta tolerance in the positions of the correlation peaks while achieving a false alarm rate equivalent to ±delta/2. Alternatively, the false alarm rate may be reduced by permitting a certain width for the correlation peak rather than limiting the delta.

If synchronization is still not found after shifting the position of the last received correlation peak, the algorithm is repeated using a different synchronization sequence (step 126). Thus, the expected positions of the received correlation peaks are calculated using different time delays associated with the synchronization sequence gap template of the synchronization sequence being tested. The algorithm is repeated until all synchronization sequences are tested (step 128). If synchronization is still not found, the algorithm starts over again and waits for a new correlation peak to be generated.

Note that the value of num_peaks may be varied depending on the level of sensitivity desired. The lower the num_peaks, the higher the sensitivity of the acquisition to noise, etc. and vice versa.

Note also that in the above-described method, the correlation peaks are verified by looking for maximum linear correlation values. Alternatively, a search can be performed over the entire received sequence rather than on a symbol by symbol (or peak to peak) basis. The entire sequence is examined against where the peaks are expected and a signal train is constructed comprising the deltas in the expected locations of the peaks. Thus, the search is performed across the entire 11 USTs at once.

Note that the invention is not limited to the type of synchronization quality measurement.

The synchronization quality measurement of counting the number of peaks exceeding a threshold is presented as an example. Alternatively, the correlation values at the expected position can be summed together and the sum of all seven correlations compared to a threshold.

Tuning of the Synchronization Point

As described supra, the synchronization point is calculated once synchronization has been declared. One of the main purposes of the acquisition mechanism is to determine the synchronization point which defines the start of the actual packet. It is at this point, that correlation of the received signal shifts from linear to cyclic and data begins to be decoded. Depending on the type of modulation used, the distance between two consecutive symbols in the codebook may be relatively very small. For example, considering DCSK modulation transmitting six bits per symbol, the distance between consecutive symbols is only four phase units. Therefore, the point of synchronization must be determined with sufficient accuracy as a shift of only 2 phase units in the synchronization point can lead to synchronization error and loss of the entire packet. Choosing the wrong synchronization point causes all symbols decoded to be shifted by one position in the codebook leading to incorrect decoding for all symbols that cannot be corrected by the error correction code.

Since the position of the last received correlation peak is permitted to vary a distance of delta phase units, the synchronization point can also vary a distance of delta phase units. Thus, in accordance with the invention, in the event of a match between the expected peak position and the received peak position, information on the differences between the expected peak position and the received peak position is used in determining the synchronization point. A final tuning of the synchronization point is performed using the average of the differences for matching peaks only as follows $$\text{sync\_pt}_{TUNED} = \text{sync\_pt} + \frac{\sum (P_{EXP} - P_{REC})}{\text{num\_matches}} \quad (1)$$

wherein sync_pt is the untuned synchronization point. Thus, the average of the shifts applied to the matching peaks is calculated and added to the calculated synchronization point. Note that the untuned synchronization point comprises the position of the last received correlation peak wherein synchronization was declared plus 1300 μs as described supra.

Synchronization Quality Factor

In accordance with the invention, a synchronization quality factor is calculated each time synchronization is declared. The quality factor is defined as follows $$\text{sync\_quality\_factor} = num\_\text{matches} + num\_\text{high\_peaks} \quad (2)$$

The quality factor is thus the sum of the number of matches and the number of correlation peaks in the correct position whose correlation value is greater than a threshold (e.g., 15 out of a 255 maximum). Thus, for a synchronization sequence of seven symbols, the quality factor ranges between 0 and 12.

In accordance with the acquisition algorithm, the acquisition phase continues until receipt of the CRC8 at the end of the packet header. If the CRC8 is correct, acquisition ends. If the CRC8 is in error, acquisition continues. If after synchronization is declared but still in acquisition, a new synchronization is declared with a quality factor higher than that of the previous one, the packet previously being received is dropped and the receiver immediately begins receiving the current packet.

In order to continue performing acquisition after synchronization is declared until receipt of the CRC8, two sets of hardware are required. Alternatively, depending on the implementation, one set of hardware may be used that is clocked at twice the nominal rate.

Criteria for Synchronization

The acquisition and synchronization mechanism of the present invention is adapted such that the criteria for declaring synchronization ensures that the case does not occur whereby erroneous data in the packet can be corrected while synchronization was not achieved. In other words, the synchronization algorithm is designed to be more reliable than data reception. In the example case where the error correction coding used is able to correct 2-3 erred symbols out of 7, the acquisition algorithm is preferably more reliable.

Assuming the synchronization sequence comprises seven symbols, the criterion for declaring synchronization is four correctly received symbols. Thus, three erred symbols out of seven is permitted and the situation where data can be corrected but synchronization was not achieved is prevented from occurring.

Further, in order to achieve a sufficiently low probability of synchronization from noise, the synchronization sequence is constructed using time delays chosen so as to provide a high autocorrelation function for each sequence having low side peaks (i.e. no more than two equal delays in one synchronization sequence).

Thus, in order to minimize the probability of synchronization due to noise, the value of the correlation peak is used as an additional criterion. In particular, in the event of any three matches, if the correlation values of 3 out of 4 peaks exceed a predefined threshold, synchronization is declared, otherwise synchronization is deemed to be caused by noise.

In addition, in order to achieve a sufficiently low probability of synchronization from another synchronization sequence, the synchronization sequence is constructed using time delays chosen so as to provide a low cross correlation function for each pair of sequences (i.e. the number of matches between the sum of consecutive delays or the delay in one sequence and the sum of consecutive delays or the delay in other sequence should be minimal).

Thus, in order to minimize the probability of synchronization from another sequence, a minimum value of the correlation peak is used as an additional criterion. In particular, in the event of any three matches (i.e. 3 erred symbols out of 7), the values of the correlation peaks of the four mismatches are checked. If the peak in error has a correlation value greater than a threshold (e.g., 30 out of 255 maximum) it is deemed to have been caused by a peak from another synchronization sequence and the declaration of synchronization is vetoed.

Station Incorporating the Mechanism of the Present Invention

The synchronization sequence generator and acquisition and synchronization circuit of the present invention may be incorporated in a communications transceiver such as a station, network node, modem, etc. One example application is in a digital modem adapted for communications over the power line media. The modem utilizes a 100-400 kHz band (for in the United States) or 95-125 kHz and 20-80 kHz band (in Europe). The modulation used is DCSK and the modem is capable of unicast, broadcast and multicast transmissions using the spread spectrum modulated signal in the appropriate band. Each packet transmitted comprises a synchronization sequence which permits the receiver to synchronize on the spreading waveform (i.e. chirp, PN sequence, etc.) followed by the packet data modulated as circularly shifted data spreading waveforms. As described above, the synchronization sequence is processed through a linear correlator while the data is decoded using cyclic correlation.

Figure 8:
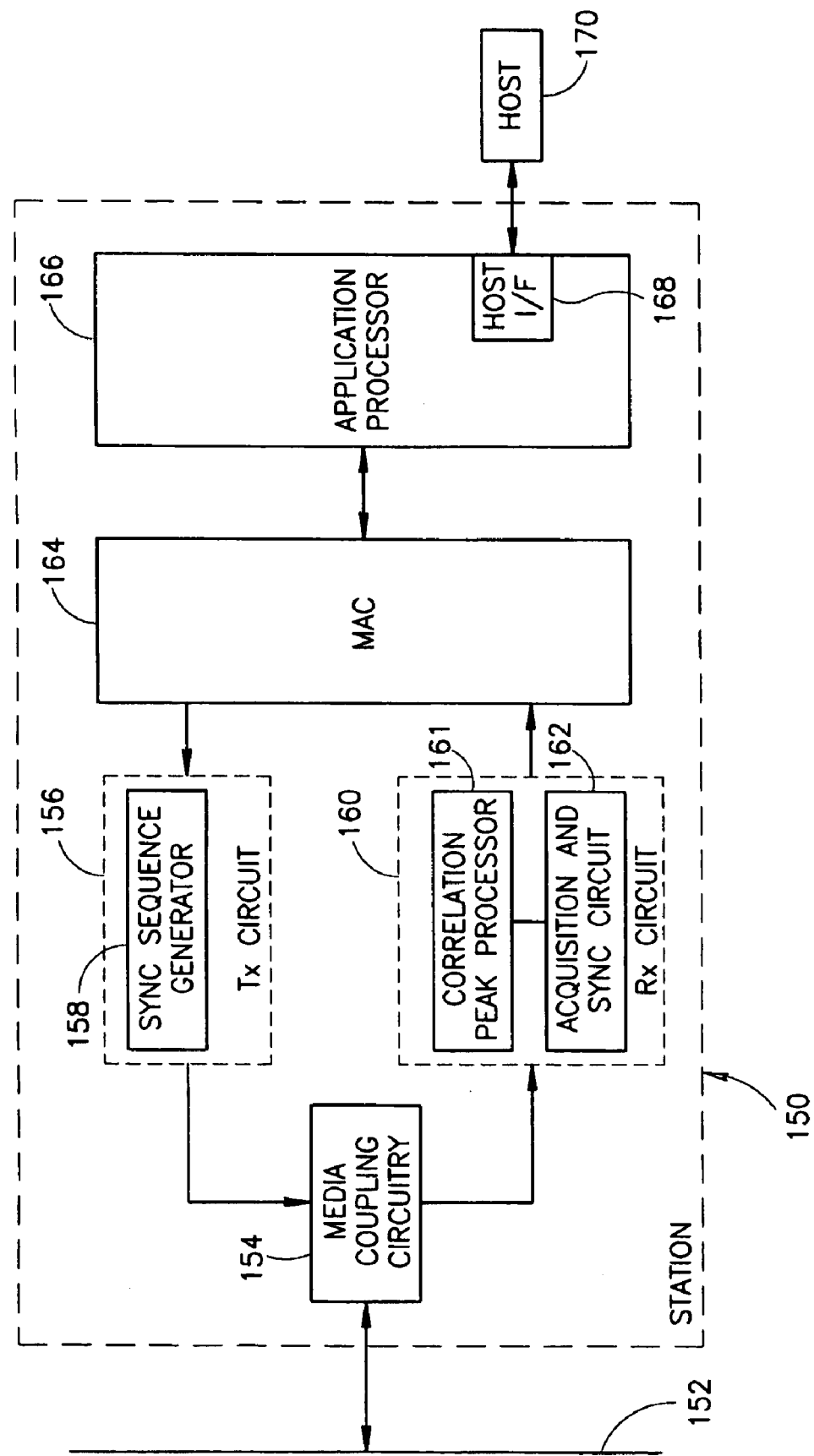
FIG. 8 is a block diagram illustrating an example embodiment of a station incorporating transmitter and receiver circuits adapted to perform the acquisition and synchronization mechanisms of the present invention.
Figure 9:
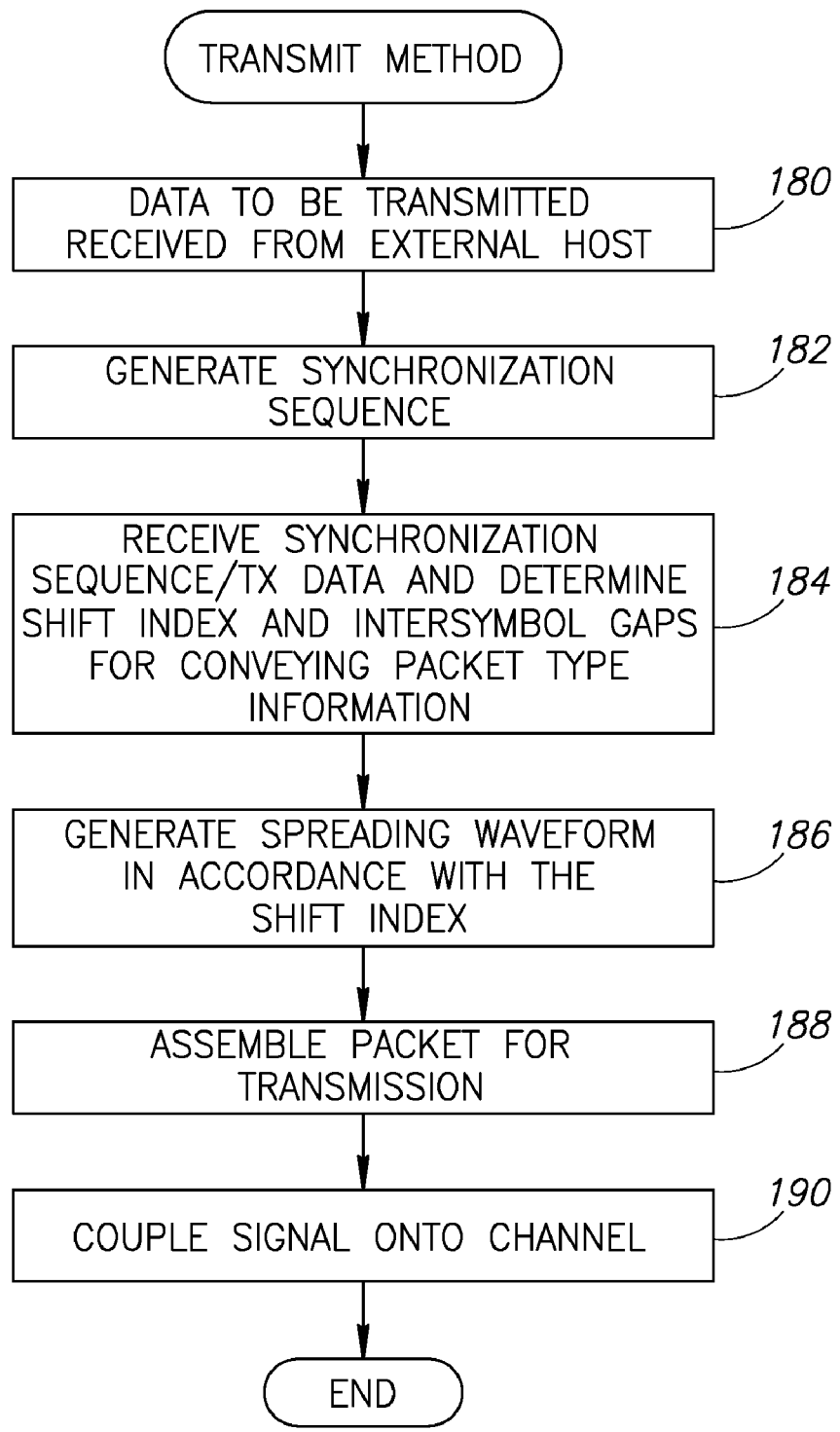
FIG. 9 is a flow diagram illustrating the transmit method of the present invention.

A block diagram illustrating an example embodiment of a station incorporating transmitter and receiver circuits adapted to perform the acquisition and synchronization sequence generation mechanisms of the present invention is shown in FIG. 8. The station, generally referenced 150, represents a station that may operate stand alone or may be incorporated within a network device such as a switch, router, hub, broadband modem, cable modem, PLC based modem, etc. for performing communication functions (i.e. implementing OSI stack protocol functions including MAC functionality). The station comprises an application processor 166 with associated static, dynamic, volatile and/or non-volatile memory (not shown) in communication therewith. The application processor is also in communication, via a host interface 168, with a host device 170. The host may be adapted to communicate over one or more networks.

The station comprises media coupling circuitry 154 for interfacing the station to the shared media 152. The transmit circuit 156 receives data for transmission from the MAC and functions to encode the data into symbols which are then modulated and transmitted over the media. The transmit circuit also comprises the synchronization sequence generator 158 constructed in accordance with the present invention which functions to generate the synchronization sequence transmitted at the start of each packet.

The transmit circuit 158 and receive circuit 160 communicate over the media via the media coupling circuitry. The Rx circuit functions to correlate and decode the received signal and generate received output data therefrom. The receive circuit also comprises the correlation peak processor 161 and acquisition and synchronization circuit 162 constructed in accordance with the present invention.

The media access controller (MAC) 164 functions, on one side, to provide transmit data to the transmit circuit and to input receive data from the receive circuit. On the processor side, it interfaces to the application processor. The MAC is adapted to implement any suitable layer 2 (i.e. link layer) media access control technique as is well known in the art.

Note that the acquisition and synchronization sequence generation mechanism may be implemented in either hardware or software. Software implementation may be adapted to reside on a computer readable medium, such as a magnetic disk, floppy disk, Flash memory card, EEROM based memory, bubble memory storage, RAM storage, ROM storage, etc. The software may also reside, in whole or in part, in the static or dynamic main memories or in firmware within the processor of a computer system. The processor may comprise any suitable processing means including microcontroller, microcomputer, microprocessor, digital signal processor (DSP), FPGA core, ASIC core, etc. In particular, the software comprises a sequence of instructions which, when executed by the processor, cause the computer system to perform the acquisition and synchronization mechanism described hereinabove.

In alternative embodiments, the present invention may be applicable to implementations of the methods and apparatus described above in integrated circuits, especially Application Specific Integrated Circuits (ASICs), Field Programmable Gate Arrays (FPGAs) or chip sets, wireless modem implementations, power line modem implementations, switching system products and transmission system products. Note that a combination of software and hardware can also be implemented, the former performing the complex operations and the latter performing the time critical operations.

For the purpose of this document, the terms switching systems products shall be taken to mean private branch exchanges (PBXs), central office switching systems that interconnect subscribers, toll/tandem switching centers and broadband core switches located at the center of a service provider's network that may be fed by broadband edge switches or access multiplexers and associated signaling and support system services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of generating a start of packet synchronization sequence for use in a transmitter, said method comprising the steps of:
   generating a plurality of N symbols to be transmitted in said synchronization sequence, wherein N is a positive integer;
   generating N−1 predetermined signals, chosen to maximize autocorrelation properties of said synchronization sequence, wherein said N−1 predetermined signals convey packet type information to a receiver;
   inserting one of said N−1 predetermined signals after each of the first N−1 symbols in said synchronization sequence;
   encoding said synchronization sequence; and
   transmitting said encoded synchronization sequence into a channel.

2. The method according to claim 1, wherein said predetermined signals comprise time delays or transmitting gaps.

3. The method according to claim 1, wherein N equals seven.

4. The method according to claim 1, further comprising generating a plurality of synchronization sequences wherein each synchronization sequence corresponds to a unique set of N−1 predetermined signals comprising time delays, each set of N−1 time delays chosen so as to minimize cross correlation between synchronization sequences.

5. The method according to claim 1, further comprising generating a plurality of synchronization sequences wherein each synchronization sequence corresponds to a different packet type.

6. The method according to claim 1, wherein said each symbol comprises a zero shifted code shift keying modulated symbol.

7. A method of generating a start of packet synchronization sequence for use in a code shift keying (CSK) based transmitter, said method comprising the steps of:
   generating a plurality of symbols of known shift rotation to be transmitted in said synchronization sequence;
   inserting a respective predetermined time delay between each of said symbols;
   encoding said synchronization sequence;
   transmitting said encoded synchronization sequence onto a channel; and
   wherein said respective predetermined time delays inserted between said symbols are adapted to convey packet type information to a receiver.

8. The method according to claim 7, wherein said predetermined time delays are chosen to yield a synchronization sequence having relatively high auto correlation properties.

9. A transmitter for use in a spread spectrum communications system, comprising:
   a synchronization sequence generator adapted to generate a synchronization sequence, said synchronization sequence representing a plurality of synchronization symbols with predetermined time delays inserted therebetween;
   an encoder adapted to determine shift indices to be applied to spreading waveforms, said shift indices determined based on said synchronization sequence;
   a spreading waveform generator adapted to generate spreading waveform signals in accordance with said shift indices; and
   wherein delays between spreading waveform signals are determined by said predetermined time delays in said synchronization sequence.

10. The transmitter according to claim 9, further comprising a synchronization sequence gap memory adapted to store a plurality of synchronization sequences, each synchronization sequence comprising a set of symbols with predefined time delays between each of said symbols.

11. The transmitter according to claim 9, implemented in an Application Specific Integrated Circuit (ASIC).

12. The transmitter according to claim 9, implemented in a Field Programmable Gate Array (FPGA).

13. A method of generating a start of packet synchronization sequence, said method comprising the steps of:
   generating a plurality of symbols to be transmitted in said synchronization sequence;
   inserting specific time delays between said plurality of symbols in said synchronization sequence, wherein said synchronization sequence selected to be substantially orthogonal to other synchronization sequences;
   transmitting said synchronization sequence onto a channel; and
   wherein said specific time delays are adapted to convey information.

14. The method according to claim 13, wherein said information comprises packet type information.

15. The method according to claim 13, wherein said synchronization sequence comprises seven symbols having respective time delays of therebetween.

16. The method according to claim 13, wherein said synchronization sequence comprises seven symbols having respective time delays of therebetween.

17. The method according to claim 13, wherein said synchronization sequence comprises seven symbols having respective time delays of therebetween.

18. The method according to claim 13, wherein said synchronization sequence comprises seven symbols having respective time delays of therebetween.

19. The method according to claim 13, wherein said synchronization sequence comprises seven symbols having respective time delays of therebetween.

20. A method of generating a start of packet synchronization sequence, said method comprising the steps of:
   generating a plurality of symbols to be transmitted in said synchronization sequence;
   inserting specific time delays between said plurality of symbols in said synchronization sequence, said time delays chosen to yield both a high autocorrelation function for a respective synchronization sequence and a low cross-correlation function for each pair of synchronization sequences; and
   transmitting said synchronization sequence onto a channel.

21. The method according to claim 20, wherein said specific time delays are adapted to convey information.

22. The method according to claim 20, wherein said specific time delays are adapted to convey packet type.

23. The method according to claim 20, wherein said synchronization sequence comprises seven symbols having respective time delays of therebetween.

24. The method according to claim 20, wherein said synchronization sequence comprises seven symbols having respective time delays of therebetween.

25. The method according to claim 20, wherein said synchronization sequence comprises seven symbols having respective time delays of therebetween.

26. The method according to claim 20, wherein said synchronization sequence comprises seven symbols having respective time delays of therebetween.

27. The method according to claim 20, wherein said synchronization sequence comprises seven symbols having respective time delays of therebetween.

* * * * *